No. 92.—*Improvement in Harness Saddles.*
What I claim as my improvement, and desire to secure by letters patent, is a flexible pad rigidly connected with the saddle tree, substantially in the manner herein set forth. JOSEPH W. BRIGGS.
J. W. Briggs
Harness Trimming.
Nº 92. A.I. Patented June 12, 1849.
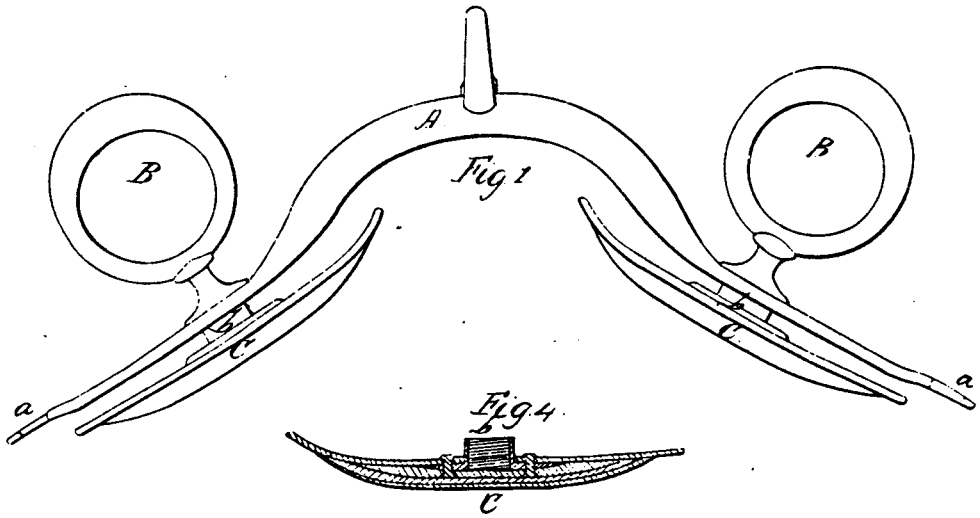
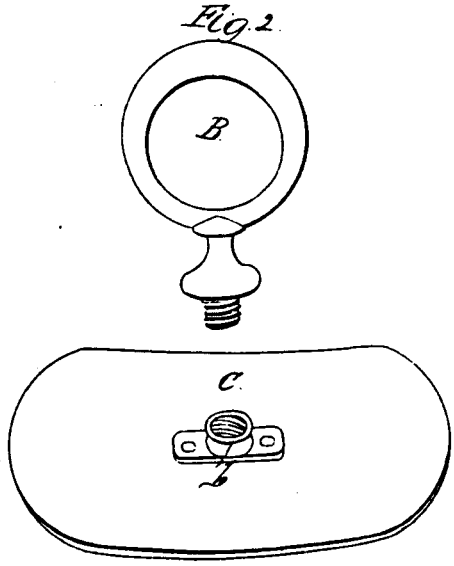
Fig 3
H. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 92 FOR THE ISSUE DATE 06/12/1849 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims